United States Patent
Na

(10) Patent No.: US 10,462,248 B2
(45) Date of Patent: Oct. 29, 2019

(54) DIGITAL CONTENT SHARING CLOUD SERVICE SYSTEM, DIGITAL CONTENT SHARING CLOUD SERVICE DEVICE, AND METHOD USING THE SAME

(71) Applicant: SK PLANET CO., LTD., Seongnam-si, Gyeonggi-do (KR)

(72) Inventor: Seung-Won Na, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 186 days.

(21) Appl. No.: 14/895,861

(22) PCT Filed: Dec. 26, 2013

(86) PCT No.: PCT/KR2013/012183
§ 371 (c)(1),
(2) Date: Dec. 3, 2015

(87) PCT Pub. No.: WO2014/196709
PCT Pub. Date: Dec. 11, 2014

(65) Prior Publication Data
US 2016/0127491 A1   May 5, 2016

(30) Foreign Application Priority Data
Jun. 7, 2013  (KR) .................. 10-2013-0065112

(51) Int. Cl.
*G06F 15/16* (2006.01)
*H04L 29/08* (2006.01)
*H04L 29/06* (2006.01)

(52) U.S. Cl.
CPC ...... *H04L 67/2828* (2013.01); *H04L 65/4084* (2013.01); *H04L 65/602* (2013.01);
(Continued)

(58) Field of Classification Search
CPC .............. H04L 67/2828; H04L 67/306; H04L 67/2823; H04L 67/12; H04L 65/602; H04L 65/4084; H04L 69/04
See application file for complete search history.

(56) References Cited

U.S. PATENT DOCUMENTS 6,138,156 A * 10/2000 Fletcher ............... H04L 12/14
                                                                    709/217
2006/0109339 A1 * 5/2006 Chao .................. G11B 20/10527
                                                                   348/14.01
(Continued)

FOREIGN PATENT DOCUMENTS

JP    2008258678 A    10/2008
JP    2009260818 A    11/2009
(Continued)

OTHER PUBLICATIONS

International Search Report for PCT/KR2013/012183 dated Apr. 28, 2014.

*Primary Examiner* — Padma Mundur
(74) *Attorney, Agent, or Firm* — Fenwick & West LLP

(57) ABSTRACT

Disclosed are a cloud service system, a cloud service device, and a method using same. When a download of a shared original content is requested, a conversion factor is determined by considering device information and network information of a terminal device requesting the download, and converted content is provided, wherein the content of the converted content has been converted based on the determined conversion factor. The conversion factor is calculated by applying an application ratio to a base conversion factor. As a result, downloading time can be reduced, network traffic can be reduced, and saving space on a terminal can be efficiently managed.

10 Claims, 8 Drawing Sheets

| 710 PERFORMANCE INFORMATION | 720 APPLICATION RATE | 730 CONVERTED IMAGE |
|---|---|---|
| GROUP 1 | 100% | 1MB |
| GROUP 2 | 90% | 0.9MB |
| GROUP 3 | 80% | 0.8MB |

(52) U.S. Cl.
CPC .............. *H04L 67/10* (2013.01); *H04L 67/12* (2013.01); *H04L 67/2823* (2013.01); *H04L 67/306* (2013.01); *H04L 69/04* (2013.01)

(56) References Cited

U.S. PATENT DOCUMENTS

| | | | |
|---|---|---|---|
| 2008/0168132 A1* | 7/2008 | Chun | G06F 17/30905 |
| | | | 709/203 |
| 2011/0029606 A1 | 2/2011 | Ozawa | |
| 2012/0166403 A1 | 6/2012 | Kim et al. | |
| 2012/0330987 A1 | 12/2012 | Lee et al. | |
| 2013/0156095 A1* | 6/2013 | Li | H04N 21/233 |
| | | | 375/240.02 |
| 2013/0179930 A1 | 6/2013 | Bae | |
| 2013/0242185 A1* | 9/2013 | Roth | H04N 21/2343 |
| | | | 348/441 |
| 2014/0036993 A1 | 2/2014 | Bae | |

FOREIGN PATENT DOCUMENTS

| | | |
|---|---|---|
| KR | 1020100071359 A | 6/2010 |
| KR | 1020110004972 A | 1/2011 |
| KR | 1020120023878 A | 3/2012 |
| KR | 1020120033450 A | 4/2012 |
| KR | 1020120072909 A | 7/2012 |
| KR | 1020120117384 A | 10/2012 |
| KR | 1020120138567 A | 12/2012 |
| KR | 1020120140436 A | 12/2012 |
| KR | 101232790 B1 | 3/2013 |

* cited by examiner

| 610 | 620 |
|---|---|
| DOWNLOAD SPEED | CONVERTED IMAGE |
| MORE THAN 5Mbps | 3MB |
| 2~5Mbps | 1MB |
| LESS THAN 2Mbps | 300KB |

| PERFORMANCE INFORMATION (710) | APPLICATION RATE (720) | CONVERTED IMAGE (730) |
|---|---|---|
| GROUP 1 | 100% | 1MB |
| GROUP 2 | 90% | 0.9MB |
| GROUP 3 | 80% | 0.8MB |

FIG. 7

| STORAGE SPACE INFORMATION (810) | APPLICATION RATE (820) | CONVERTED IMAGE (830) |
|---|---|---|
| GROUP A | 100% | 0.9MB |
| GROUP B | 80% | 0.72MB |
| GROUP C | 50% | 0.45MB |

FIG. 8

DIGITAL CONTENT SHARING CLOUD SERVICE SYSTEM, DIGITAL CONTENT SHARING CLOUD SERVICE DEVICE, AND METHOD USING THE SAME

CROSS REFERENCE TO RELATED APPLICATION

This application claims the priority of Korean Patent Application No. 10-2013-0065112 filed on Jun. 7, 2013 in the Korean Patent and Trademark Office. Further, this application is the National Phase application of International Application No. PCT/KR2013/012183 filed on Dec. 26, 2013, which is incorporated herein by reference in its entirety.

TECHNICAL FIELD

The present invention generally relates to a cloud service system, a cloud service device, and a method using the cloud service device and, more particularly, to a cloud service system, a cloud service device, and a method using the cloud service device, which allow multiple terminal devices to share digital content, such as videos or images, with each other.

This application claims the benefit of Korean Patent Application No. 10-2013-0065112, filed Jun. 7, 2013, which is hereby incorporated by reference in its entirety into this application.

BACKGROUND ART

As cloud services have been popularized, a user may share content on various types of devices. For example, the user may share a single picture on terminal devices, such as a mobile phone, a tablet PC, a laptop PC, and a desktop PC, through a cloud server.

However, since content is uploaded to such a cloud server, and various terminal devices download the uploaded content as needed, network traffic continuously increases, and the time required by individual users to download the content using limited network resources also continuously increases. In particular, as the resolution and quality of digital content are gradually improved, the size of digital content such as videos or images has greatly increased, as a result of which problems such as an increase in the time required for downloading from cloud servers and an increase in network traffic have become more and more serious.

Meanwhile, the storage space in terminal devices for playing digital content is limited. Therefore, when portable devices are used to download voluminous digital content from a cloud server and play the content, the management of storage space is a very important factor in efficiently utilizing the devices.

Korean Patent Application Publication No. 10-2012-0138567 discloses technology in which, when an image of a content player is captured using a mobile phone and is then transmitted to a server, the server extracts the code of the content player from the captured image, converts the content based on the extracted code, and provides the converted content.

However, Korean Patent Application Publication No. 10-2012-0138567 discloses a technical spirit that merely indicates that content is converted based on code corresponding to a content player in relation to the conversion of content, and does not describe in detail the type of information to be considered or the method of considering the information in order to convert the content.

As the content to be shared through a cloud computing system becomes more diverse, and the variety of terminal devices that share content through a cloud server is also increasing, various types of information related to a terminal device for playing content must be considered, and additional environmental information, as well as terminal-related information, must be considered, in order to convert the content into a format optimized for the terminal device. However, as the amount of information to be considered increases, it is difficult to perform content conversion using a simple conversion table.

Therefore, new technology capable of converting content by efficiently considering various types of information that includes the storage space in the terminal device is urgently required so as to convert content into a format optimized for a terminal device when a cloud service is provided.

DISCLOSURE

Technical Problem

An object of the present invention is to convert original content into a format suitable for a terminal device (size or resolution) and transmit the converted content when a cloud server transmits the same content to multiple terminal devices to be played on individual devices, thus improving the download speed of customers who use a cloud service and reducing network traffic.

Another object of the present invention is to provide a detailed and efficient algorithm for determining a conversion factor in consideration of network information, device information, etc. in order for a cloud server to convert content in a format optimized for each of terminal devices.

A further object of the present invention is to allow a cloud server to differently set the conversion factor of content to be transmitted in consideration of storage space in a terminal device, thus efficiently managing the storage space in the terminal device.

Technical Solution

A cloud service device according to the present invention to accomplish the above objects includes a cloud service device, including a conversion information collection unit for collecting pieces of conversion information including network information and device information corresponding to at least one terminal device; a conversion factor determination unit for determining a conversion factor to be used to convert original content based on the pieces of conversion information; and a content conversion unit for generating converted content by converting the original content depending on the conversion factor, and for providing the converted content to the terminal device. Here, the device information may include storage space information of the terminal device.

The conversion factor determination unit may determine a base conversion factor in consideration of one or more of the pieces of conversion information, and determine the conversion factor by applying an application rate, determined in consideration of one or more of remaining pieces of conversion information, to the base conversion factor.

The conversion factor determination unit may determine the base conversion factor in consideration of the network information.

The conversion factor determination unit may set the base conversion factor to a larger value when a state of a network is better.

The conversion factor determination unit sets the base conversion factor using a conversion table in which base conversion factors corresponding to respective network state groups generated by grouping states of networks are stored.

The device information may include performance information of the terminal device in addition to the storage space information.

The conversion factor determination unit may determine the conversion factor by sequentially applying a first application rate determined in consideration of the performance information and a second application rate determined in consideration of the storage space information to the base conversion factor.

The conversion factor determination unit may set the first application rate to a larger value when performance of the terminal device is better, and set the second application rate to a larger value when there is more remaining storage space in the terminal device.

The conversion factor determination unit may set the first application rate and the second application rate using a conversion table in which application rates corresponding to respective performance groups, generated by grouping performance of terminal devices, are stored.

The base conversion factor may correspond to a maximum value of the conversion factor, and the application rate is greater than 0% and less than or equal to 100%.

The performance information may include one or more of Central Processing Unit (CPU) information, resolution information, and memory capacity information of the terminal device.

The cloud service device may further include a member authentication processing unit for performing authentication of the terminal device, wherein the converted content is generated only when the terminal device has been successfully authenticated.

The cloud service device may receive setting information about whether agreement to provision of the converted content has been made for each terminal device, and provides the converted content only to a terminal device that has agreed to provision of the converted content.

Further, a cloud service method according to an embodiment of the present invention includes collecting pieces of conversion information including network information and device information corresponding to at least one terminal device; determining a conversion factor to be used to convert original content that is shared through a cloud service device, based on the pieces of conversion information; generating converted content by converting the original content depending on the conversion factor; and transmitting the converted content to the terminal device, wherein the device information includes storage space information of the terminal device.

Determining the conversion factor may be configured to determine a base conversion factor in consideration of one or more of the pieces of conversion information, and determine the conversion factor by applying an application rate, determined in consideration of one or more of remaining pieces of conversion information, to the base conversion factor.

Determining the conversion factor may be configured to determine the conversion factor by sequentially applying a first application rate determined in consideration of performance information of the terminal device and a second application rate determined in consideration of the storage space information to the base conversion factor.

Furthermore, a cloud service system according to an embodiment of the present invention includes at least one terminal device; and a cloud service device for collecting pieces of conversion information including network information and device information corresponding to the terminal device, generating a conversion factor based on a base conversion factor and an application rate that are generated using the pieces of conversion information, converting original content based on the conversion factor, and providing the converted content to the terminal device.

Advantageous Effects

In accordance with the present invention, the download speed of customers who use a cloud service may be improved, and network traffic for the cloud service may be reduced.

Further, the present invention may effectively determine a conversion factor, such as resolution or file size, in such a way that, when a cloud server determines the conversion factor in consideration of various factors, such as network information, information about the display performance of a terminal, and information about the storage space in the terminal, important factors are primarily considered, and the ratio of individual factors to be considered is suitably set.

Furthermore, the present invention allows a cloud server to differently set the conversion factor of content to be transmitted in consideration of the storage device in the terminal device, thus efficiently managing the storage space in the terminal device.

DESCRIPTION OF DRAWINGS

FIG. 7 is a diagram showing an example of a conversion table required to determine an application rate;

FIG. 8 is a diagram showing another example of a conversion table required to determine an application rate;

BEST MODE

Figure 1:
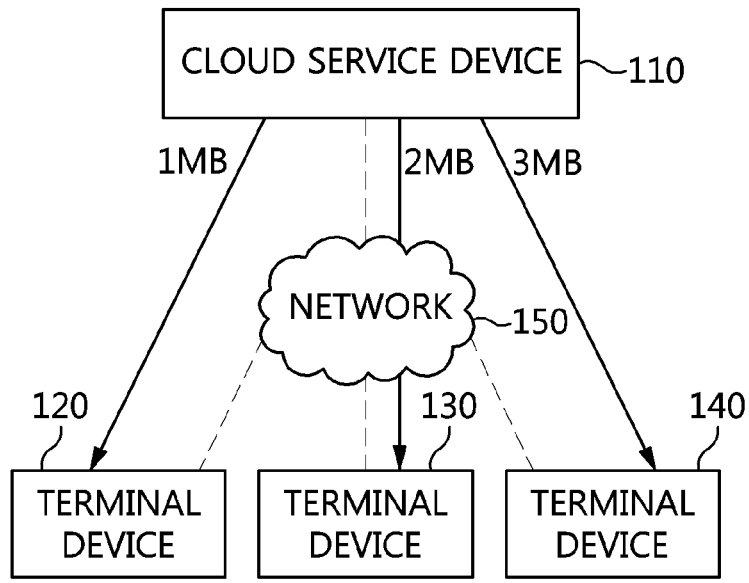
FIG. 1 is a block diagram showing a cloud service system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing a cloud service system according to an embodiment of the present invention.

Referring to FIG. 1, the cloud service system according to the embodiment of the present invention includes a cloud service device 110 and terminal devices 120, 130, and 140.

Here, the cloud service device 110 and the terminal devices 120, 130, and 140 may be connected to each other over a network 150. The network between the cloud service device 110 and the terminal device 120, the network between the cloud service device 110 and the terminal device 130, and the network between the cloud service device 110 and the terminal device 140 may be the same as each other or different from each other.

Here, the cloud service device 110 may correspond to a cloud server. That is, the cloud service device 110 may store content that is desired to be shared by the terminals, and may suitably provide the content to the corresponding terminal at the request of the terminals.

Each of the terminal devices 120, 130, and 140 may individually upload content to the cloud service device, or may download the corresponding content from the cloud service device.

Here, the content may be all types of digital or analog data, for example, still images such as pictures or drawings, moving images (video), audio files such as sound source files, and two-dimensional (2D)/3D images which may be perceived by a user via the senses of sight or sound.

The cloud service device 110 may collect conversion information that includes network information and device information corresponding to each of the terminal devices 120, 130, and 140. Further, the cloud service device 110 may generate a base conversion factor and an application rate using the collected conversion information. Furthermore, the cloud service device 110 may generate a conversion factor based on the generated base conversion factor and application rate. The cloud service device 110 may convert original content based on the generated conversion factor and transmit the converted content to the terminal devices 120, 130, and 140. At this time, the device information may include information about the storage space in the terminal devices 120, 130, and 140.

That is, the present invention is configured to convert original content, uploaded to and shared by the cloud service device 110, that is, the cloud server, into a suitable format in consideration of network information and device information, including information about the storage space in the terminal devices, and cause the converted file to be downloaded, without causing the original content to be uniformly downloaded regardless of the state of the network or the characteristics of devices. Therefore, in accordance with the present invention, network traffic may be reduced, the download time may be shortened, and the storage space in the terminals may be efficiently managed.

In the example shown in FIG. 1, the terminal device 120 may be connected to the cloud service device 110 over a third generation (3G) network, the terminal device 130 may be connected to the cloud service device 110 over a WiFi network, and the terminal device 140 may be connected to the cloud service device 110 over a Long Term Evolution (LTE) network. At this time, the terminal device 120 may receive content having a size of 1 MB, the terminal device 130 may receive content having a size of 2 MB, and the terminal device 140 may receive content having a size of 3 MB, even when the terminal devices 120, 130, and 140 request the same original content.

In another example, the terminal device 120 may have 20% storage space remaining, the terminal device 130 may have 40% storage space remaining, and the terminal device 140 may have 60% storage space remaining. At this time, the terminal device 120 may receive content having a size of 1 MB, the terminal device 130 may receive content having a size of 2 MB, and the terminal device 140 may receive content having a size of 3 MB, even when the terminal devices 120, 130, and 140 request the same original content.

In a further example, the terminal device 120 may have a display having a resolution of 320×240, the terminal device 130 may have a display having a resolution of 720×640, and the terminal device 140 may have a display having a resolution of 1024×768. At this time, the terminal device 120 may receive content having a size of 1 MB, the terminal device 130 may receive content having a size of 2 MB, and the terminal device 140 may receive content having a size of 3 MB, even when the terminal devices 120, 130, and 140 request the same original content.

Each of the terminal devices 120, 130, and 140 may include a Personal Computer (PC), a notebook computer, a mobile phone, a tablet PC, a navigation device, a smart phone, a Personal Digital Assistant (PDA), a Portable Multimedia Player (PMP), or a digital broadcast receiver such as a Digital Video Broadcasting (DVB) system.

The network 150 provides a path for transferring data between the cloud service device 110 and the terminal devices 120, 130, and 140, and is a concept that encompasses both conventionally used networks and networks that may be developed in the future. For example, the network 150 may be an Internet Protocol (IP) network for providing a large-size data transmission/reception service and a seamless data service via an IP, or an all-IP network that is an IP network structure in which different types of networks are integrated based on IP, and may be implemented by combining one or more of a wired network, a 3G mobile communication network including a Wireless Broadband (Wibro) network and a Wideband Code Division Multiple Access (WCDMA) network, a 3.5G mobile communication network including a High Speed Downlink Packet Access (HSDPA) network and an LTE network, a 4G mobile communication network including an LTE advanced network, a satellite communication network, and a Wi-Fi network.

Figure 2:
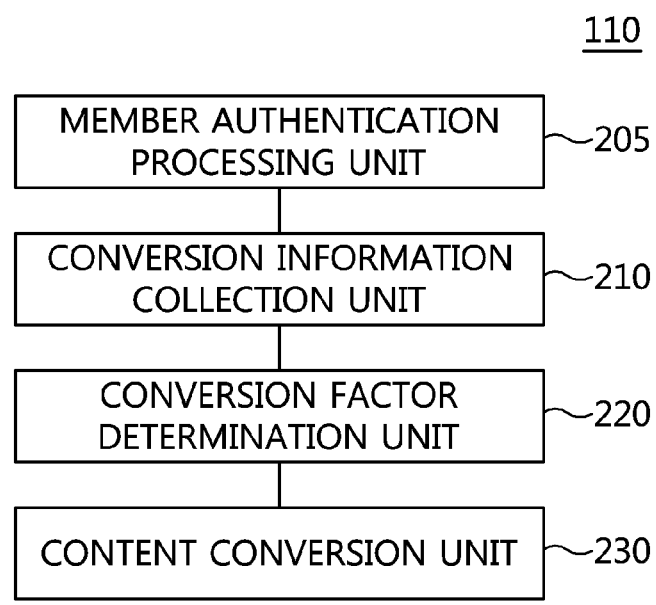
FIG. 2 is a block diagram showing an example of the cloud service device shown in FIG. 1.

FIG. 2 is a block diagram showing an example of the cloud service device shown in FIG. 1.

Referring to FIG. 2, the cloud service device 110 shown in FIG. 1 includes a member authentication processing unit 205, a conversion information collection unit 210, a conversion factor determination unit 220, and a content conversion unit 230.

The member authentication processing unit 205 authenticates a terminal device. For example, the cloud service device allows the content conversion unit 230 to generate converted content and provide it to the terminal device only when the terminal device is successfully authenticated.

The conversion information collection unit 210 collects pieces of conversion information including network information and device information corresponding to at least one terminal device.

Here, the device information may include information about the storage space in the terminal device. The device information may include information about the performance of the terminal device in addition to the storage space information. The performance information may include one or more of the CPU information, resolution information, and memory capacity information of the terminal device.

The conversion factor determination unit 220 determines the conversion factor to be used to convert original content based on the pieces of conversion information.

Here, the original content may be content that is desired to be shared by multiple terminal devices through the cloud service device. At this time, the original content may be uploaded from one of the multiple terminal devices.

Here, the conversion factor may be any of the size, resolution, or type of the file to be converted.

The conversion factor determination unit 220 may determine a base conversion factor in consideration of one or more of the pieces of conversion information, and may determine the conversion factor by applying an application rate, determined by considering one or more of the remaining pieces of conversion information, to the base conversion factor. For example, the conversion factor determination unit 220 may determine the base conversion factor in consideration of the network information.

Here, the base conversion factor may correspond to the maximum value of the conversion factor. In this case, the application rate may be greater than 0% and less than or equal to 100%.

That is, according to an embodiment of the present invention, to suitably perform content conversion for each terminal device, the present invention generates the conversion factor in such a way as to set a target conversion factor (base conversion factor) for the file to be converted by primarily considering the most important conversion information (e.g. network information), and to set the application rate to be applied to the target conversion factor by secondarily considering the remaining pieces of conversion information, thus enabling optimal content conversion to be performed by suitably reflecting various types of conversion information.

Here, the conversion factor determination unit 220 may set the base conversion factor to a larger value when the state of the network is better.

Here, the conversion factor determination unit 220 may set the base conversion factor using a conversion table in which base conversion factors corresponding to respective network state groups generated by grouping the network states are stored.

Further, the conversion factor determination unit 220 may determine the conversion factor by sequentially applying a first application rate, which is determined in consideration of the performance information of the terminal device, and a second application rate, which is determined in consideration of the storage space information, to the base conversion factor.

At this time, the conversion factor determination unit 220 may set the first application rate to a larger value when the performance of the terminal device is better, and may set the second application rate to a larger value when there is more remaining storage space in the terminal device.

The conversion factor determination unit 220 may set the first application rate and the second application rate using a conversion table in which application rates corresponding to respective performance groups, generated by grouping the performance of terminal devices, are stored.

The content conversion unit 230 generates converted content by converting the original content depending on the conversion factor, and provides the converted content to the corresponding terminal device.

In accordance with an embodiment, the cloud service device may receive setting information about whether the corresponding terminal device agrees to the provision of the converted content, for each terminal device, and may provide the converted content only to terminal devices that agree to the provision of the converted content.

Figure 3:
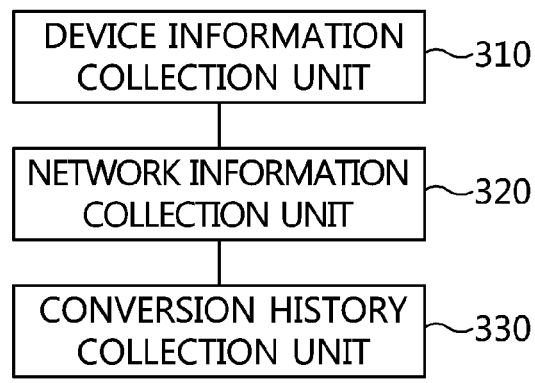
FIG. 3 is a block diagram showing an example of the conversion information collection unit shown in FIG. 2.

FIG. 3 is a block diagram showing an example of the conversion information collection unit shown in FIG. 2.

Referring to FIG. 3, the conversion information collection unit 210 shown in FIG. 2 includes a device information collection unit 310, a network information collection unit 320, and a conversion history collection unit 330.

The device information collection unit 310 collects pieces of device information about terminal devices from respective terminal devices. For example, the device information may include the storage space information and performance information of each terminal device. At this time, the performance information may include one or more of the CPU information, resolution information, and memory capacity information of each terminal device. Here, the storage space information may be the capacity of the remaining storage space in the corresponding terminal device or the ratio of the remaining storage space to the total storage space.

The network information collection unit 320 collects pieces of network information corresponding to the respective terminal devices. For example, the network information may be information about the type of network used by the corresponding terminal device (e.g. 3G, LTE, WiFi, or the like), bandwidth information, information about a data rate (download speed) guaranteeing a preset bit error rate, etc.

The conversion history collection unit 330 collects pieces of conversion information previously used to convert content for respective terminal devices. For example, pieces of conversion information used for each content conversion for respective terminal devices may be stored in a table, and the conversion history collection unit may collect conversion information previously used for content conversion using this table. At this time, not only the conversion information, but also conversion factors generated using the conversion information, may be stored in the table.

Figure 4:
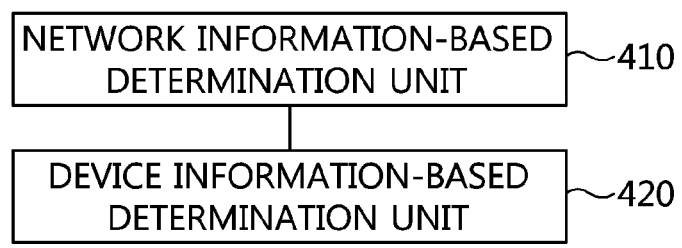
FIG. 4 is a block diagram showing an example of the conversion factor determination unit shown in FIG. 2.

FIG. 4 is a block diagram showing an example of the conversion factor determination unit shown in FIG. 2.

Referring to FIG. 4, the conversion factor determination unit 220 shown in FIG. 2 includes a network information-based determination unit 410 and a device information-based determination unit 420.

The network information-based determination unit 410 determines a base conversion factor required to determine a conversion factor, based on network information corresponding to a relevant terminal device.

The network information may be information about the type of network used by the relevant terminal device (e.g. 3G, LTE, WiFi, or the like), bandwidth information, information about a data rate (download speed) guaranteeing a preset bit error rate, etc.

The device information-based determination unit 420 determines an application rate based on the device information corresponding to the relevant terminal device.

Here, the device information may include the storage space information and performance information of the terminal device. Here, the performance information may include one or more of the CPU information, resolution information, and memory capacity information of the terminal device. Here, the storage space information may be the capacity of the remaining storage space in the relevant terminal device or the ratio of the remaining storage space to the total storage space.

The device information-based determination unit 420 may generate two or more application rates based on two or more pieces of conversion information. For example, the device information-based determination unit 420 may determine a first application rate based on the performance of the device, and may determine a second application rate based on the storage space in the device. At this time, the first application rate may be primarily applied to the base conversion factor and the second application rate may be secondarily applied to the result of the primary application, and then a conversion factor may be calculated.

Although not explicitly shown in FIG. 4, the, conversion factor determination unit may determine the conversion factor to be applied to the corresponding terminal device, based on the conversion information or conversion factors collected by the conversion history collection unit shown in FIG. 3. For example, when a specific terminal device has a conversion history of reducing the size by 80%, if the corresponding terminal subsequently requests additional content, a conversion factor corresponding to the size reduction of 80% may be immediately determined, without considering additional conversion information.

Figures 5, 6:
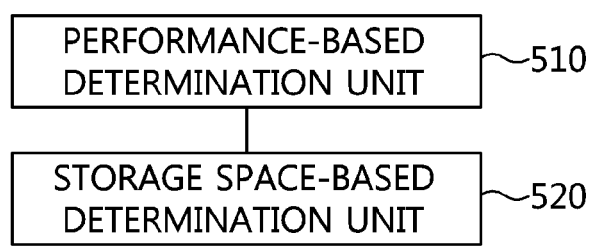
FIG. 5 is a block diagram showing an example of the device information-based determination unit shown in FIG. 4.
FIG. 6 is a diagram showing an example of a conversion table required to determine a base conversion factor.

FIG. 5 is a block diagram showing an example of the device information-based determination unit shown in FIG. 4.

Referring to FIG. 5, the device information-based determination unit 420 shown in FIG. 4 includes a performance-based determination unit 510 and a storage space-based determination unit 520.

The performance-based determination unit 510 determines a conversion factor based on device performance information corresponding to a terminal device.

Here, the device performance information may include one or more of the CPU information, resolution information, and memory capacity information of the terminal device.

The performance-based determination unit 510 may set the first application rate to a larger value when the performance of the terminal device is better.

The storage space-based determination unit 520 determines a conversion factor based on the storage space information corresponding to the terminal device.

Here, the storage space information may be the capacity of the remaining storage space in the corresponding terminal device or the ratio of the remaining storage space to the total storage space thereof.

Here, the storage space-based determination unit 520 may set the second application rate to a larger value when there is more remaining storage space in the terminal device.

FIG. 6 is a diagram showing an example of a conversion table required to determine a base conversion factor.

Referring to FIG. 6, it can be seen that converted image sizes 620 corresponding to converted content sizes are arranged to correspond to download speeds 610 corresponding to respective network states.

That is, when a download request for an original image having a size of 3 MB is received from a terminal device, the cloud service device according to the present invention may set the converted image size 620 to 3 MB if, with reference to the conversion table shown in FIG. 6, the download speed 610 of the terminal device is more than 5 Mbps, may set the converted image size 620 to 1 MB if the download speed 610 of the terminal device ranges from 2 to 5 Mbps, and may set the converted image size 620 to 300 KB if the download speed 610 of the corresponding terminal device is less than 2 Mbps.

For example, when the download speed of a specific terminal device is 3 Mbps, the converted image size corresponding to the terminal device may be set to 1 MB, as shown in FIG. 6. At this time, the converted image size of 1 MB may be the base conversion factor.

Here, the converted image size may be set to a larger value when the download speed is faster.

FIG. 7 is a diagram showing an example of a conversion table required to determine an application rate.

Referring to FIG. 7, it can be seen that application rates 720 are arranged to correspond to respective pieces of performance information 710 of devices. Furthermore, in FIG. 6, converted image sizes 730, which correspond to the results of applying the application rates to the case where a converted image size of 1 MB is determined to be the base conversion factor in FIG. 6, are arranged to correspond to the pieces of performance information 710 of devices.

That is, after the base conversion factor has been set to 1 MB according to the download speed corresponding to the network information, the cloud service device according to the present invention may set the converted image size 730 to 1 MB by setting the application rate to 100% if, with reference to the conversion table shown in FIG. 7, the performance information 710 of the terminal device corresponds to group 1, may set the converted image size 730 to 0.9 MB by setting the application rate to 90% if the performance information 710 of the terminal device corresponds to group 2, and may set the converted image size to 0.8 MB by setting the application rate to 80% if the performance information 710 of the terminal device corresponds to group 3.

The example shown in FIG. 7 may be a conversion table required to set a first application rate, as described in the accompanying claims.

Here, the performance information 710 may include one or more of the CPU information, resolution information, and memory capacity information of the terminal device.

For example, when the performance information of a specific terminal device corresponds to group 2, the application rate corresponding to the terminal device is set to 90%, as shown in FIG. 7, and then the size of the converted image will be set to 0.9 MB. At this time, the converted image size of 0.9 MB may be regarded as the result of applying the first application rate to the base conversion factor.

Here, the application rate 720 may be set to a larger value when the device performance is better.

FIG. 8 is a diagram showing another example of a conversion table required to determine an application rate.

Referring to FIG. 8, it can be seen that application rates 820 are arranged to correspond to respective pieces of storage space information 810. Furthermore, converted image sizes 830, which correspond to the results of applying the application rates to the case where the converted image size of 1 MB is set to the base conversion factor in FIG. 6 and where the first application rate is set to 90% in FIG. 7, are arranged to correspond to respective pieces of storage space information 810.

That is, after the base conversion factor has been determined to be 1 MB based on the download speed, which is network information, and the first application rate has been determined to be 90% based on the device performance information, the cloud service device according to the present invention may set the converted image size 830 to 0.9 MB by setting the application rate to 100% if, with reference to the conversion table shown in FIG. 8, the storage space information 810 of the terminal device corresponds to group A, may set the converted image size 830 to 0.72 MB by setting the application rate to 80% if the storage space information 810 of the terminal device corresponds to group B, and may set the converted image size to 0.45 MB by setting the application rate to 50% if the storage space information 810 of the terminal device corresponds to group C.

The example shown in FIG. 8 may be a conversion table required to determine a second application rate, as described in the accompanying claims.

Here, the storage space information 810 may be the capacity of the remaining storage space in the corresponding terminal device or the ratio of the remaining storage space to the total storage space thereof.

For example, when the storage space information of a specific terminal device corresponds to group B, the application rate corresponding to the specific terminal device may be set to 80%, as shown in FIG. 8, and thus the size of the converted image may be set to 0.72 MB. At this time, the converted image size of 0.72 MB may be regarded as the result of applying both the first application rate and the second application rate to the base conversion factor.

Here, the application rate 820 may be set to a larger value when there is more remaining storage space.

Consequently, the base conversion factor, the first application rate, and the second application rate are determined in consideration of the conversion information for the corresponding terminal device using the conversion tables shown in FIGS. 6, 7 and 8, and the first application rate and the second application rate are sequentially applied to the base conversion factor. Thus, when a request for original content having a size of 3 MB is received, converted content, in which the size of the original content is changed to 0.72 MB, is provided.

In the examples shown in FIGS. 6, 7, and 8, although the case where the base conversion factor is determined in consideration of network information, the first application rate is determined in consideration of device information, and the second application rate is determined in consideration of storage space information has been described by way of example, the technical spirit of the present invention should not be limited to this case. That is, it is also possible to determine the base conversion factor in consideration of storage space information, determine the first application rate in consideration of network information, and determine the second application rate in consideration of both network information and device information. According to an embodiment, it is also possible to calculate three or more application rates and apply the application rates to the base conversion factor.

In accordance with the present invention, since content is converted into a format having an optimal size for a terminal device used by a customer who uses a cloud service and then the converted content is provided, traffic caused by the transmission of unnecessary data may be reduced, and optimized content may be provided.

Figure 9:
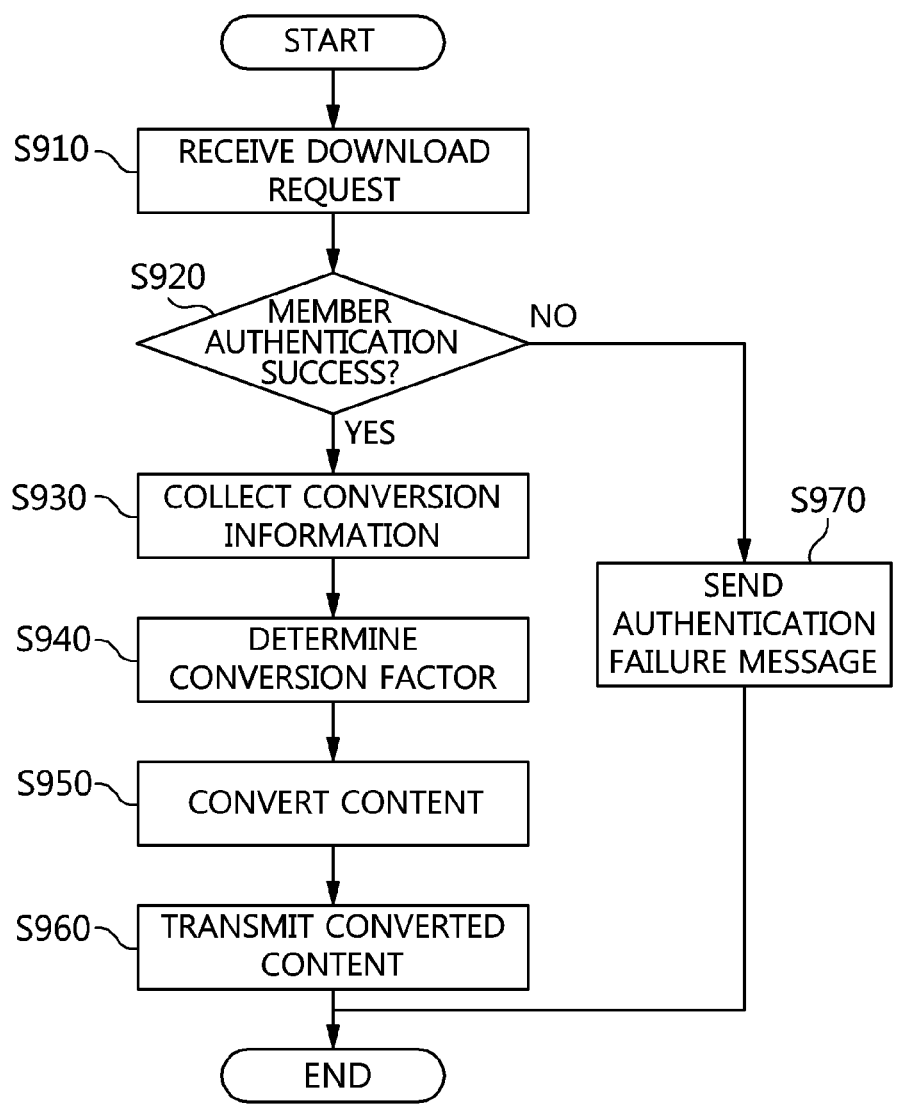
FIG. 9 is an operation flowchart showing a cloud service method according to an embodiment of the present invention from the standpoint of a cloud server.

FIG. 9 is an operating flowchart showing a cloud service method according to an embodiment of the present invention from the standpoint of a cloud server.

Referring to FIG. 9, in the cloud service method according to the embodiment of the present invention, the cloud service device receives a download request for original content that is desired to be shared from a terminal device (S910).

Further, the cloud service method performs member authentication of the terminal device that requested the download, and determines whether the terminal device has been successfully authenticated as a member (S920).

If it is determined at step S920 that the terminal device has been successfully authenticated as a member, the cloud service method according to the embodiment of the present invention collects pieces of conversion information including network information and device information corresponding to at least one terminal device (S930).

Here, the device information may include the storage space information and performance information of the terminal device.

Also, the cloud service method according to the embodiment of the present invention determines a conversion factor to be used to convert original content that is shared through the cloud service device based on the pieces of conversion information (S940).

Here, at step S940, a base conversion factor may be determined in consideration of one or more of the pieces of conversion information, and a conversion factor may be determined by applying an application rate, which is determined in consideration of one or more of the remaining pieces of conversion information, to the base conversion factor.

At this time, at step S940, the conversion factor may be determined by sequentially applying both a first application rate, determined in consideration of the performance information, and a second application rate, determined in consideration of the storage space information, to the base conversion factor.

In this case, the base conversion factor may correspond to the maximum value of the conversion factor, and the application rate may be greater than 0% and less than or equal to 100%.

Further, the cloud service method according to the embodiment of the present invention converts the original content depending on the conversion factor and generates converted content (S950).

Then, the cloud service method according to the embodiment of the present invention transmits the converted content to the terminal device (S960).

If it is determined at step S920 that the authentication of the terminal device as a member has failed, the cloud service method according to the embodiment of the present invention sends an authentication failure message to the terminal device (S970).

Figure 10:
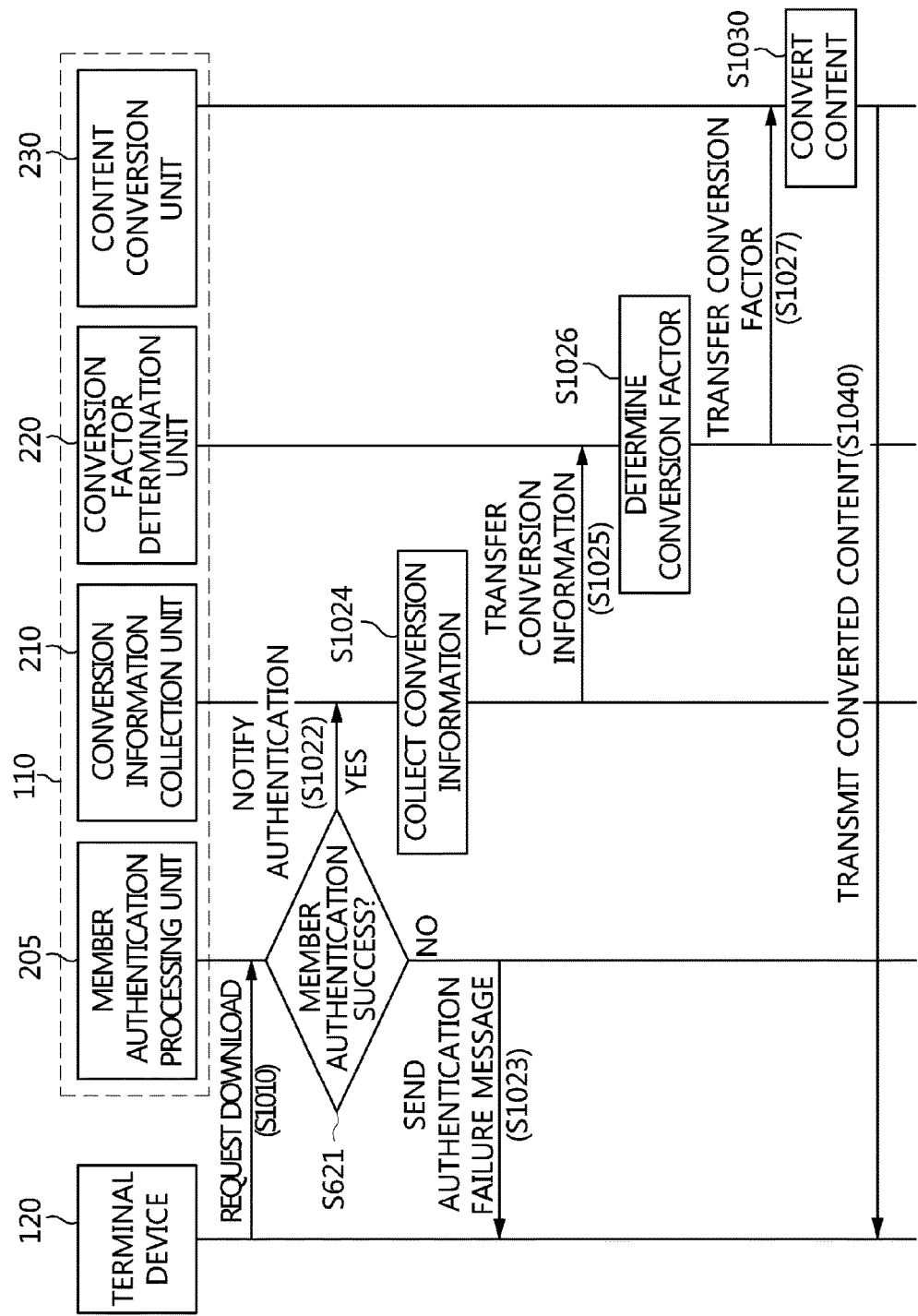
FIG. 10 is an operation flowchart showing the overall process of a cloud service method according to an embodiment of the present invention.

FIG. 10 is an operation flowchart showing the overall process of the cloud service method according to an embodiment of the present invention.

Referring to FIG. 10, the terminal device 120 requests the download of original content that is shared from the cloud server (S1010).

The member authentication processing unit 205 of the cloud service device 110 performs member authentication of the terminal device 120 that requested the download of the original content, and determines whether the terminal device 120 has been successfully authenticated (S621).

If it is determined at step S621 that authentication has failed, the member authentication processing unit 205 sends an authentication failure message to the terminal device 120 (S1023).

If it is determined at step S621 that the terminal device has been successfully authenticated, the member authentication processing unit notifies the conversion information collection unit 210 of the completion of authentication (S1022).

The conversion information collection unit 210 collects pieces of conversion information corresponding to the terminal device 120 that requested the download of original content (S1024).

At this time, the pieces of conversion information may include network information and device information. Here, the device information may include the storage space information and performance information of the terminal device 120.

The conversion information collection unit 210 transfers the collected conversion information to the conversion factor determination unit 220 (S1025).

The conversion factor determination unit 220 determines the conversion factor to be used to convert the original content, based on the pieces of conversion information transferred from the conversion factor determination unit 220 (S1026).

Here, the conversion factor determination unit 220 may determine a base conversion factor in consideration of one or more of the pieces of conversion information, and may also determine the conversion factor by applying an application rate, determined in consideration of one or more of the remaining pieces of conversion information, to the base conversion factor.

Here, the conversion factor determination unit 220 may determine the base conversion factor in consideration of the network information.

Here, the conversion factor determination unit 220 may set the base conversion factor to a larger value when the state of the network is better.

Here, the conversion factor determination unit 220 may set the base conversion factor using a conversion table in which base conversion factors corresponding to respective network state groups generated by grouping the network states are stored.

Here, the conversion factor determination unit 220 may determine the conversion factor by sequentially applying a first application rate, which is determined in consideration of the performance information of the terminal device, and a second application rate, which is determined in consideration of the storage space information, to the base conversion factor.

At this time, the conversion factor determination unit 220 may set the first application rate to a larger value when the performance of the terminal device 120 is better, and may set the second application rate to a larger value when there is more remaining storage space in the terminal device 120.

Here, the conversion factor determination unit 220 may set the first application rate and the second application rate using a conversion table in which application rates corresponding to respective performance groups, generated by grouping the performance of the terminal device 120, are stored.

The conversion factor determination unit 220 transfers the determined conversion factor to the content conversion unit 230 (S1027).

The content conversion unit 230 converts the original content depending on the transferred conversion factor (S1030), and transmits the converted content to the terminal device 120 (S1040).

Figure 11:
FIG. 11 is a diagram showing an example of an interface screen on which the setting of content conversion is performed for each terminal device.

FIG. 11 is a diagram showing an example of an interface screen on which the setting of content conversion is performed for each terminal device.

Referring to FIG. 11, it can be seen that the cloud service device provides an interface screen that allows a user to set content conversion for each terminal device.

That is, when the user registers four types of terminal devices, that is, a notebook (YKIMTHINK), a desktop device (YKIMDELL), a tablet device (YKIMIPAD), and a mobile phone (SHV-E250S) on the cloud service device and desires to share content, the cloud service device provides an interface enabling the setting of information about whether the user agrees to the provision of converted content for the four types of terminal devices. The user may agree to the provision of converted content only for desired terminal devices, thus enabling content to be converted based on the conversion information for each desired terminal device.

In the example shown in FIG. 11, the user may mark a field corresponding to 'optimal conversion' only for the notebook (YKIMTHINK) and for the mobile phone (SHV-E250S), and may then be provided with converted content. In this case, setting may be performed such that, for the desktop device (YKIMDELL) and for the tablet device (YKIMIPAD), original content is downloaded without conversion.

Although not explicitly shown in FIG. 11, the cloud service device allows the user to select any one of original content, optimally converted content, and thumbnail content for each terminal device. Here, the 'original content' may literally denote the uploaded content itself, the 'optimally converted content' may denote content that is generated by collecting conversion information, determining a conversion factor, and converting the content based on the determined conversion factor according to the present invention, and the 'thumbnail content' may denote content converted into a minimum size.

In this way, the user may set information about whether to be provided with converted content for each terminal device, thus enabling an efficient cloud service conforming to the user's intention to be provided.

Figure 12:
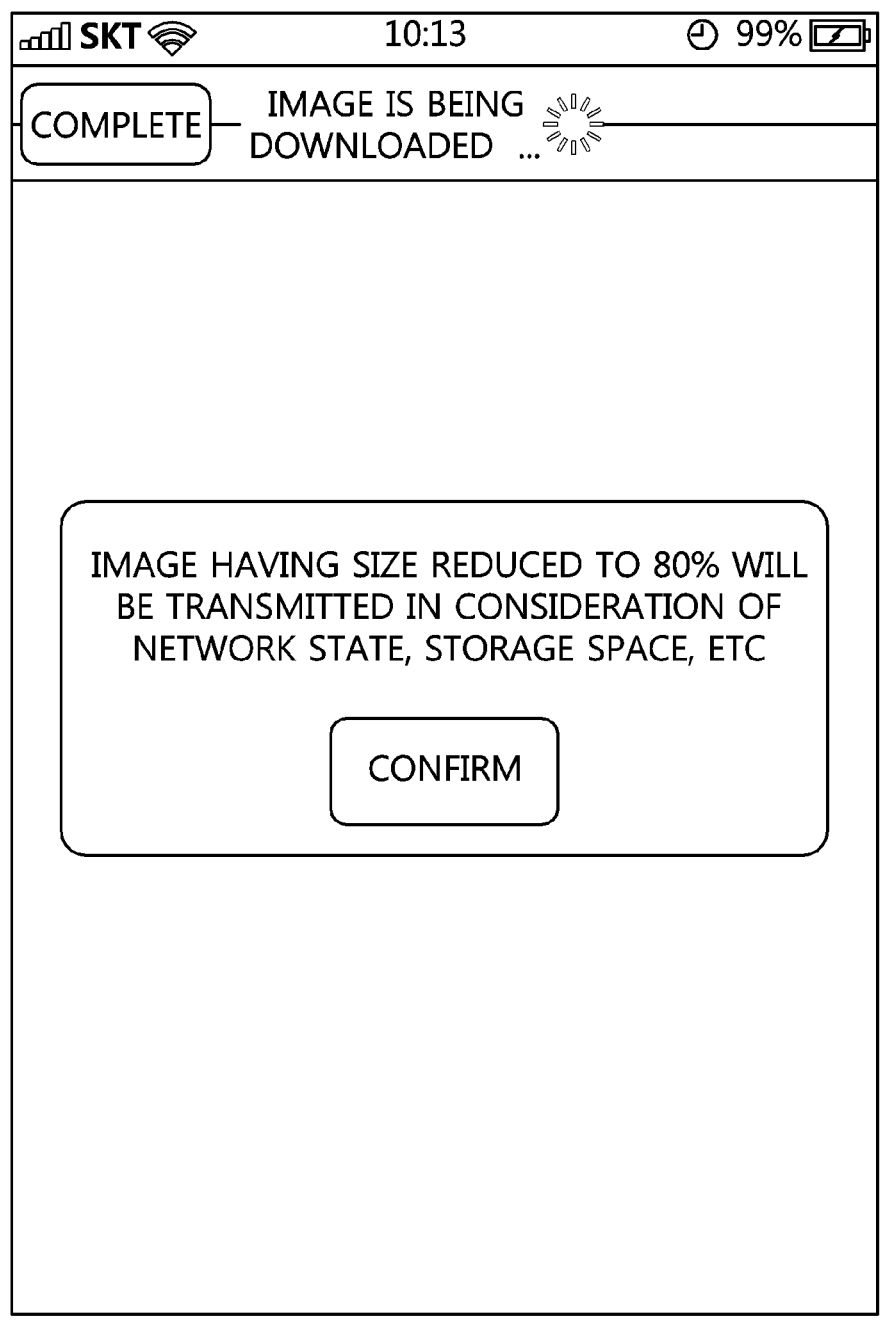
FIG. 12 is a diagram showing an example of an interface screen displayed on a receiving terminal device for a cloud service according to the present invention.

FIG. 12 is a diagram showing an example of an interface screen displayed on a receiving terminal device for a cloud service according to the present invention.

Referring to FIG. 12, it can be seen that, when the cloud service device converts original content into a format suitable for a terminal device and provides the converted content, a message indicating that converted content is to be provided is displayed on the terminal device.

The terminal device may recognize that converted content, obtained by converting the original content, is downloaded through the cloud service device, by means of the message such as that shown in FIG. 12, and may also determine the size of the downloaded file, which has been reduced.

The cloud service method according to the present invention may be implemented in the form of program instructions that may be executed by various computer means and may be stored in a computer-readable storage medium. The computer-readable storage medium may include program instructions, data files, and data structures solely or in combination. The program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine language code, such as code created by a compiler, and high-level language code executable by a computer using an interpreter. The hardware devices may be configured to operate as one or more software modules in order to perform the operation of the present invention, and vice versa.

As described above, in the cloud service system, the cloud service device, and the method using the cloud service device according to the present invention, the configurations and schemes in the above-described embodiments are not limitedly applied, and some or all of the above embodiments can be selectively combined and configured so that various modifications are possible.

INDUSTRIAL APPLICABILITY

According to the present invention, in order to improve the download speed of customers who use a cloud service and reduce network traffic, when a cloud server transmits the same content to multiple terminal devices and causes the content to be played on the individual terminal devices, the original content is converted into a format suitable for the corresponding terminal and the converted content is transmitted. In particular, considering the current trend, in which the penetration of smart phones is increased and the number of cloud service users is increased, the utilization of cloud service technology according to the present invention will not be low.

The invention claimed is:

1. A computer-implemented cloud service device comprising:
a conversion information collection unit configured to collect conversion information including network information and device information corresponding to at least one terminal device;
a conversion factor determination unit configured to:
determine a conversion factor that is configured to convert an original content based on the conversion information;
determine a converted content size of an original content size corresponding to a download speed of the terminal device;
set the determined converted content size as a base conversion factor;
calculate a first result by applying a first application rate to the set base conversion factor, wherein the first application rate is set corresponding to performance information of the terminal device such that the first application rate is set to 100% when the set base conversion factor is allocated to the performance information having a first maximum value; and
determine the conversion factor by applying a second application rate to the calculated first result after calculating the first result, wherein the second application rate is set corresponding to storage space information of the terminal device such that the second application rate is set to 100% when the set base conversion factor is allocated to the storage space information having a second maximum value; and
a content conversion unit configured to:
convert the original content based on the conversion factor; and
transmit the converted content to the terminal device, wherein the device information comprises the storage space information of the terminal device and the performance information of the terminal device,
wherein the performance information comprises at least one of central processing unit (CPU) information or resolution information of the terminal device,
wherein the network information comprises at least one of network type information, bandwidth information or a data rate guaranteeing a preset bit error rate, and
wherein at least one of the conversion information collection unit, the conversion factor determination unit, or the content conversion unit is executed by a processor using programs and at least one of non-transitory storage devices.

2. The cloud service device of claim 1, wherein the conversion factor determination unit sets the base conversion factor to a greater value than a predetermined value when a state of a network is better than a predetermined condition.

3. The cloud service device of claim 2, wherein the conversion factor determination unit sets the base conversion factor using a conversion table in which base conversion factors corresponding to respective network state groups generated by grouping states of networks are stored.

4. The cloud service device of claim 3, wherein the conversion factor determination unit sets the first application rate and the second application rate using a conversion table in which application rates corresponding to respective performance groups, generated by grouping performance of terminal devices, are stored.

5. The cloud service device of claim 1, wherein the base conversion factor corresponds to a maximum value of the conversion factor, and the application rate is greater than 0% and less than or equal to 100%.

6. The cloud service device of claim 3, wherein the performance information further comprises memory capacity information of the terminal device.

7. The cloud service device of claim 1, further comprising:
a member authentication processing unit configured to authenticate the terminal device, wherein the converted content is generated only when the terminal device is authenticated.

8. The cloud service device of claim 1, wherein the cloud service device is configured to:
receive setting information about whether agreement to provision of the converted content is set by each terminal device; and
provide the converted content only to a terminal device that agreed to the provision of the converted content.

9. A computer-implemented cloud service method implemented by a processor of a cloud service device, the method comprising:
collecting, by the processor, conversion information including network information and device information corresponding to at least one terminal device;
determining, by the processor, a conversion factor that is configured to convert an original content based on the conversion information;
determining, by the processor, a converted content size of an original content size corresponding to a download speed of the terminal device;
setting, by the processor, the determined converted content size as a base conversion factor;
calculating, by the processor, a first result by applying a first application rate to the set base conversion factor, wherein the first application rate is set corresponding to performance information of the terminal device such that the first application rate is set to 100% when the set base conversion factor is allocated to the performance information having a first maximum value;

determining, by the processor, the conversion factor by applying a second application rate to the calculated first result after calculating the first result, wherein the second application rate is set corresponding to storage space information of the terminal device such that the second application rate is set to 100% when the set base conversion factor is allocated to the storage space information having a second maximum value;

converting, by the processor, the original content based on the conversion factor; and transmitting, by the processor, the converted content to the terminal device, wherein the device information comprises the storage space information of the terminal device and the performance information of the terminal device, wherein the performance information comprises at least one of central processing unit (CPU) information or resolution information of the terminal device, and wherein the network information comprises at least one of network type information, bandwidth information or a data rate guaranteeing a preset bit error rate.

10. A cloud service system, comprising:

at least one terminal device; and a computer-implemented cloud service device including a processor using programs and at least one non-transitory storage devices, the cloud service device causing the processor to:

collect conversion information including network information and device information corresponding to a terminal device;

determine a converted content size of an original content size corresponding to a download speed of the terminal device;

set the determined converted content size as a base conversion factor;

calculate a first result by applying a first application rate to the set base conversion factor, wherein the first application rate is set corresponding to performance information of the terminal device such that the first application rate is set to 100% when the set base conversion factor is allocated to the performance information having a first maximum value;

determine the conversion factor by applying a second application rate to the calculated first result after calculating the first result, wherein the second application rate is set corresponding to storage space information of the terminal device such that the second application rate is set to 100% when the set base conversion factor is allocated to the storage space information having a second maximum value;

generate the conversion factor based on the base conversion factor and the application rate;

convert an original content based on the conversion factor; and transmit the converted content to the terminal device, wherein the device information comprises the storage space information of the terminal device and the performance information of the terminal device, wherein the performance information comprises at least one of Central Processing Unit (CPU) information or resolution information of the terminal device, and wherein the network information comprises at least one of a network type information, bandwidth information or a data rate guaranteeing a preset bit error rate.

* * * * *